Dec. 12, 1967   JEAN-MARIE MASSOUBRE   3,357,470
PNEUMATIC TIRES
Filed Dec. 15, 1965   3 Sheets-Sheet 1

INVENTOR
JEAN-MARIE MASSOUBRE
BY
HIS ATTORNEYS

Dec. 12, 1967   JEAN-MARIE MASSOUBRE   3,357,470
PNEUMATIC TIRES
Filed Dec. 15, 1965                3 Sheets-Sheet 2

INVENTOR
JEAN-MARIE MASSOUBRE
BY
HIS ATTORNEYS

Dec. 12, 1967  JEAN-MARIE MASSOUBRE  3,357,470
PNEUMATIC TIRES
Filed Dec. 15, 1965  3 Sheets-Sheet 3

INVENTOR
JEAN-MARIE MASSOUBRE
BY
Brumbaugh, Free, Graves & Donohue
HIS ATTORNEYS

United States Patent Office 3,357,470
Patented Dec. 12, 1967

3,357,470
PNEUMATIC TIRES
Jean-Marie Massoubre, Clermont-Ferrand, France, assignor to Compagnie Generale des Etablissements Michelin, raison sociale Michelin & Cie, Clermont-Ferrand, France
Filed Dec. 15, 1965, Ser. No. 514,004
Claims priority, application France, Dec. 18, 1964, 1,814
11 Claims. (Cl. 152—361)

This invention relates to improvements in tires and tire casings of the type having a tread which is strengthened by means of a crown or peak reinforcement between the carcass and the tread, and more particularly to improvements in the crown or reinforcements of such tires to obtain greater durability, improved rolling efficiency and roadability.

Tires having crown reinforcements between the tread and the carcass are well known and their advantages are well recognized in the tire industry. The peak reinforcements consisting usually of two or more plies of parallel cords, usually associated with a carcass of radial cords and in which the inclinations of the cords in the crown reinforcement plies are such as to form a generally triangulated reinforcement substantially coextensive with the tread. Heretofore, the inclinations of the cords of the crown reinforcing plies have been selected more or less arbitrarily within wide ranges and without regard to the effect of the components of forces developed during the operation of the tires which art on the cords themselves and on the rubber or elastomer in which they are sheathed. As a consequence, these forces have developed stresses in the tires which have a tendency to cause relative movement of the cords in the plies subjecting the sheathing rubber between the cords in the plies to tensile and shearing stresses which tend to break down or rupture the rubber or elastomer between the cords, causing cord separation. This effect is particularly noticeable at the edges of the crown reinforcing plies where the ends of the cords are located, particularly when the tires are used under severe operating conditions, such as high speed operation or operation under heavy loads. Under these conditions, the rubber or elastomer between the cords show little resistance to shearing stress which in turn results in separation or deformation of the cords. The development of the stresses in the tire also has a tendency to somewhat increase the rolling resistance of the tire.

In accordance with the present invention, it has been determined that coupling the cords of the plies in predetermined angular relationship such that the resultants of the stresses developed during the operation of the tire are all essentially perpendicular to the cords of the plies, i.e. substantially devoid of shearing stresses, results in a decreased tendency of the plies or cords to separate and improved roadability and a greatly improved rolling efficiency of the tire.

More particularly, in accordance with the present invention, by relating the angles at which the cords of the several plies are disposed with respect to the two main directions of the tires, i.e. longitudinally of the tire and transversely of the tire, so that the angles $a$ and $b$ formed by two adjacent peak plies are such as to satisfy the equation $$\tan(a+b) - 2\tan b = 0$$

or approximately 0, and with the cords of the plies inclined in different directions, the stresses developed are such as to be directed perpendicular to the cords of the plies, thereby eliminating the shearing stresses and providing a much greater resistance to cord or ply separation in the tire.

The term "direction of the tire" is intended to mean the longitudinal and transverse directions with respect to the tire, that is, the direction defined by the trace of the tire in the median symmetry plane and the plane containing the axis of the wheel, respectively. Moreover, the angle of a crown reinforcing ply is intended to mean the angle between 0 and 90° formed by the cords (all parallel in a ply) with respect to the direction of the tire. Moreover, it will be understood that two plies have the same direction or opposite directions, depending upon whether the directions for the cords are or are not within the same quadrants defined by the two main directions of the tire.

More particularly, it will be understood that within limits set forth hereinafter, the inclination or direction of the cords of one ply in the crown reinforcement will determine the inclination of another or other plies in the crown reinforcement on the basis of the equation set forth above, and the variations in the inclinations of the plies is possible while nevertheless maintaining a coupling between the plies such that the desired substantial freedom from shearing stresses is obtained throughout the entire extent of the crown reinforcement.

Another feature of the invention is the provision of means for joining the edges of the different plies making up the peak reinforcement to render the tension and stresses uniform throughout the length of each reinforcing cord and thereby prevent the ends of the cords located on the edges or close to the edges of the crown reinforcement from being displaced, especially under the influence of a tension or force higher at one edge than at the center of the tire or other edge of the tire, such as frequently ocurs during a turning movement. In other words, the distribution of stresses between the wires or cords of the crown reinforcement is maintained the same at the edge of the crown reinforcement as at the center of the reinforcement.

The edges of the crown plies may be joined in various ways. For example, the edges of one ply may be folded over to enclose the edges of one or more plies. For best results, the folded portions should overlap the edges of the other ply or plies by at least 10 mm. The angle of the folded and overlying portions may be the same or different from the angle of the ply of which they are a continuation.

Another means for locking the edges of the reinforcements may be obtained by providing narrow U-shaped folded portions of a few centimeters width which overlie the edges of the crown plies. When metallic cords are used, they may be joined by soldering, and in the case of synthetic or natural fiber cord plies, they may be joined by sewing, cementing or other suitable means.

Another factor in obtaining uniform distribution of stresses throughout the lengths of the cords is the arrangement of the crown reinforcement in a cylindrical or substantially cylindrical shape, that is, with a minimum transverse curvature which does not exceed two times, and preferably not more than one and one-half times, the curvature of the longitudinal direction of the tire. A cylindrical or substantially cylindrical form offers the advantage over a transversely curved crown reinforcement of being developable. Consequently, the differences in the behavior in the zone of contact of the tread with the roadway and the variations in the inclination of the cords between the edges and the center of the crown reinforcing plies within a single meridian plane are greatly diminished.

For a better understanding of the present invention, reference may be had to the accompanying drawings in which FIGURE 1 is a diagrammatic illustration of the trigonometric explanation of the angular relation of the cords of the crown reinforcing plies in a tire embodying the present invention;

FIGURES 4, 6, 8, 10, 12, 14 and 16 are views in cross-section of the tread zones of tires including modified forms of crown reinforcements embodying the invention; and FIGURES 5, 7, 9, 11, 13, 15 and 17 are developed longitudinal sectional views of the crown reinforcements of the treads shown in FIGURES 4, 6, 8, 10, 12, 14 and 16, respectively.

In all the FIGURES 2, 4, 6, 8, 10, 12, 14 and 16, the wires or cords which form the crown plies are illustrated as being very close to one another, as they normally are.

In order to simplify and clarify the developed plan views, FIGURES 3, 5, 7, 9, 11, 13, 15 and 17, only a few wires or cords are shown with wide spaces between them. The plan views represent the plies of the crown reinforcement in their angular relation in the finished tire. Although the wires or cords are not rectilinear in the finished tire because they are arranged therein over a cylindrical surface and their path is helicoidal, they are shown as straight lines in FIGURES 3, 5, 7, 9, 11, 13, 15 and 17 inasmuch as these are views of the cylindrical surface developed flat. The essential feature is that over their entire lengths, each cord forms a constant angle with the longitudinal direction, except for changes in direction of certain plies folded back at the edges of the crown reinforcement, as explained hereinafter.

Figure 1:
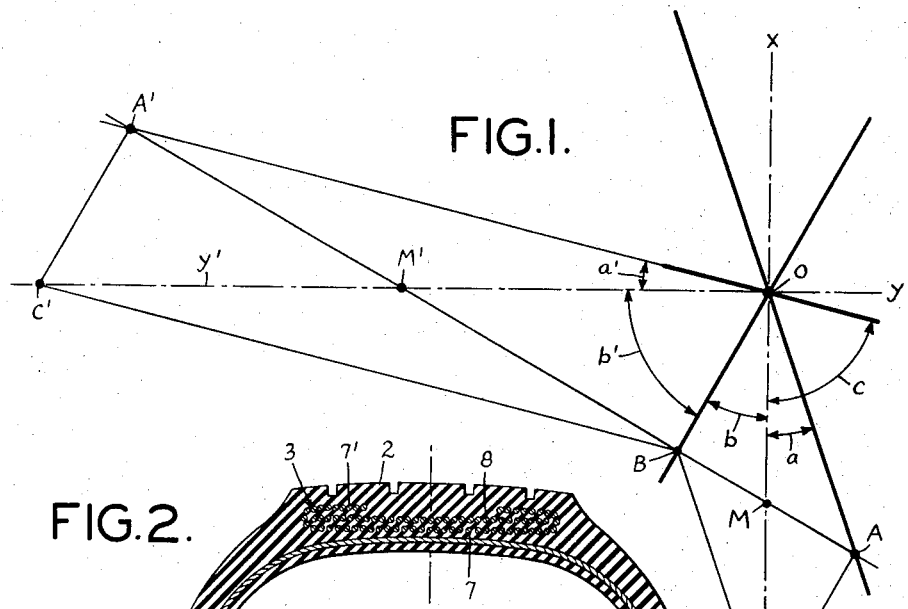

FIGURE 1 illustrates a very simple graphic method of determination of a pair of angles $a$ and $b$, to satisfy the equation tangent $(a+b)-2$ tangent $b=0$. In this figure, the two axes $x0x'$ and $y0y'$ represent respectively the longitudinal and the transverse directions of the tire. Through a point B defining the direction OB forming the angle $b$ with $x0x'$ and the angle $b'$ (complementary of $b$) with $y0y'$, the perpendicular to OB is drawn which intersects $x0x'$ at M and $y0y'$ M', and extends as far as A and A' so that $MA=BM$ and $M'A'=BM'$. The directions OA and OA' form, respectively, the angle $a$ with $x0x'$ and the angle $a'$ with $y0y'$ and are such that tangent $(a+b)-2$ tangent $b=0$ and tangent $(a'+b')-2$ tangent $b'=0$ Actually, assuming $OB=1$, the different tangents of the angles are represented by the distances BA, BM, BA' and BM'. The couples of directions OA and OB, on the one hand, and OA' and OB, on the other hand, are couples of directions in accordance with the invention.

The importance of associating the direction OB with either the direction OA or the direction OA' is easily understood and based on the fact that in the parallelograms OBCA and OBC'A', the diagonals BA and BA' are perpendicular to OB. Consequently, the forces represented by the vectors BO and BC, for example tensions along the wires or cords of the peak reinforcement, have a resultant BA perpendicular to one of the directions of the cords. Accordingly, it can be concluded that the tensions of the peak reinforcement cords parallel to OA and OB of the two peak plies, which tensions are produced by the forces acting in a main direction of the tire, have a resultant which is perpendicular to one of the directions of the cords. The forces parallel to the main directions tending to lengthen the parallelograms OBCA and OBC'A' are expressed in a simple compression of the rubber connection (binding rubber) perpendicularly to OB, without producing any sliding or shearing parallel to OB.

The foregoing explains why the angles $a$ and $b$ must be the angles formed by the plies in the inflated tire at working pressure and mounted on the pertinent rim, and should be so at any point whatsoever across the width of the peak reinforcement and not only in the vicinity of the median symmetry plane.

The angles are susceptable to some departure from the equation tangent $(a+b)-2$ tangent $b=$zero. The permissible variation either positive or negative, depend upon $a$ and $b$. In general, it is advisable to choose $a$ and in a manner whereby the angle OBA of FIGURE 1 does not deviate by more than 10° in one or the other direction from its optimum value of 90°. It is easy to determine whether two angles $a$ and $b$, with $b$ being greater than $a$, satisfy this condition. As a matter of fact, the co-tangent of the angle OBA being $$\frac{\text{tangent } (a+b)-2 \text{ tangent } b}{\text{tangent } (a+b) \cdot \text{tangent } b}$$

this latter value must lie between −tangent 10° and +tangent 10°. It should be understood that the choice of the coupling of angles $a$ and $b$, such as $a=b$, will not be practical if $a$ and $b$ are the angles of the plies with respect to the longitudinal direction of the tread. Actually, in this special case, the angle OBA is a complementary angle of angle $a$. Thus it follows that $a$ must be at most 10° which for practical purposes is too small to permit easy manufacture of the tire.

Generally speaking, where tangent $(a+b)-2$ tangent $b=0$, or approximately 0, any value of $b$ from 0° to 90° will have one single corresponding value for $a$ which is always smaller than $b$, such value ranging from 0° to 19.5° approximately. On the other hand, any angle $a$, within these limits, corresponds to two angle, $b_1$ and $b_2$, one ranging from 0 to 35° approximately, the other one from 35° to 90°. When $a$ is 19.5°, the values of the two angles $b_1$ and $b_2$ are interchangeable, $b_1$ and $b_2$ being 35° each, more exactly:

$$\text{tangent } a = \frac{\sqrt{2}}{4} \text{ and tangent } b_1 = \text{tangent } b_2 = \frac{\sqrt{2}}{2}$$

Where two adjacent plies are present in the peak reinforcement, the angles of which with respect to one another are in accordance with the invention, the reinforcement may control other plies disposed at angles which may or may not be in accordance with the invention. The important factor is that within the group of plies in the crown reinforcement, there are at least two adjacent plies having cords disposed at angles in accordance with the invention. It is preferred when the peak reinforcement controls several couples of adjacent plies, all the couples of adjacent plies conform to the invention, and this may be obtained in various manners.

In accordance with another embodiment of the invention, the peak reinforcement comprises at least three plies which, respectively, form the angles $a$, $b$, $c$ with the longitudinal direction, such angles being such that the terms tangent $(a+b)-2$ tangent $b$ and tangent $(b+c)+$cotangent $b$ are close to zero and preferably zero, with the angle $b$ pertaining to the angle of the cords of the intermediate ply, adjacent to the two others, and having a direction opposite to that of the two others.

FIGURE 1 discloses an example of three cord directions OA, OB and OA', in accordance with this embodiment. The value tangent $(b+c)+2$ cotangent $b$ is the same as 2 tangent $b'$−tangent $(a'+b')$ if 90°−$b$ is substituted for $b'$ and 90°−$c$ is substituted for $a'$, i.e., if one fixes the inclination of OA' by the angle $c$ formed with $x'0x$.

In such a case, each value of $b$ from 0 to 90° corresponds to one value and one value only of $a$ ranging from 0 to 19.5° and one value and one value only for $c$, ranging from 90° to 70.5°, approximately.

A special situation occurs when the angle $b$ is close to or equal 45°. As illustrated in FIGURE 1, when $b=b'=45°$, $BA=BA'$ The forces BO and BC, on the one hand, and BO and BC', on the other hand, have resultants which are equal and in opposite directions. The values of $a$ and $c$ corresponding to $b=45°$ are such that tangent $a=\frac{1}{3}$ and tangent $c=3$, i.e., that $a$ is approximately 18.5° and $c$ approximately 71.5°. In this special case, $a$ and $c$ are complementary and the two corresponding directions OA and OA' are symmetrical with respect to QB. In this case, it is possible to depart further from the optimum values for $a$, $b$, $c$, provided either the characteristic of complementarily of $a$ and $c$ or the characteristic of symmetry of OA and OA' with reference to OB is maintained.

In accordance with a second embodiment of the invention, the peak reinforcement comprises at least three plies which respectively form the angles $b_1$, $a$, $b_2$ with the longitudinal direction x—x of the tire, these angles being such that the quantities tangent $(a+b_1)-2$ tangent $b_1$ and tangent $(a+b_2)-2$ tangent $b_2$ are close to zero and by preference zero, with the angle, $a$, corresponding to the middle of the three plies and having a diretcion contrary to that of the two otherrs.

In this embodiment, the two angles $b_1$ and $b_2$ or adjacent angles conforming to the relation tangent $(a+b)=2$ tangent $b$, correspond to the angle $a$ of the intermediate or middle ply. Naturally, it is desirable that the angle $a$ should not be substantially greater than 20° so that the relation in question may be given an even approximate solution. In this second modification as in the first, the number of intermediate plies can be increased, for example, two plies forming the same angle and running in the same direction may be substituted for a single ply. The middle ply may also be replaced by two plies equally inclined with respect to the longitudinal direction but in opposite directions. In this case, the direction of the ply adjacent to the intermediate ply, the direction of which has been changed, must also be changed.

In accordance with a third modification, the peak reinforcement comprises at least two peak plies forming with the longitudinal direction the angle $a$ and the angle $b$, respectively, and possibly other plies forming likewise the angle $a$ or the angle $b$, with the same direction, these angles being such that the quantity tangent $(a+b)-2$ tangent $b$ is close to zero and preferably zero, and two consecutive plies having contrary directions if their angle are different and the same or contrary directions if their angles are equal.

This modification may comprise a peak reinforcement having only two plies, but may comprise also a peak reinforcement with three, four or more plies running in two directions only. In such a reinforcement, a special relationship may be provided, wherein tangent $$a=\frac{\sqrt{2}}{4} \text{ and tangent } b=\frac{\sqrt{2}}{2}$$

i.e., $a=19.5°$ and $b=$approximately 35°. Actually, in this relation the ply a with 35° inclination may be considered as replacing the two plies with angles $b_1$ and $b_2$ combined with the ply with angle $a$.

Other variations than those enumerated above are possible involving at least two or three different ply angles. In particular, a peak reinforcement can be constructed comprising four plies all having different angles and such that any two consecutive plies would have their angles arranged in conformity with the relationship provided for by the invention and would be in opposite directions.

The following examples of tires having the new cord relations in the crown reinforcement are illustrative of the invention.

Figure 2:
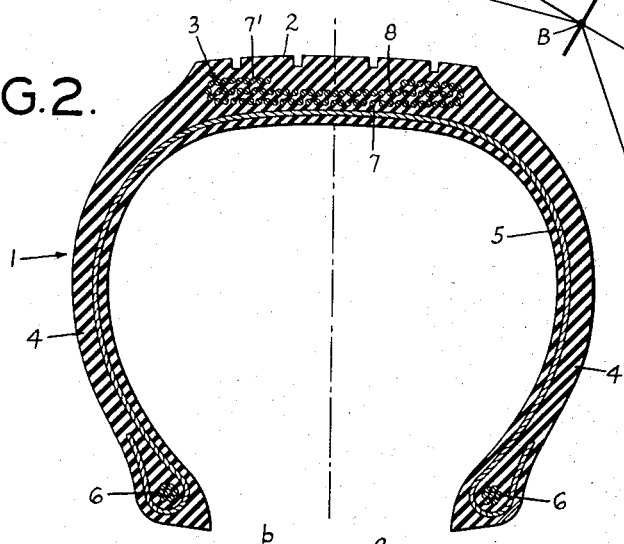
FIGURE 2 is a view in section of a tire having a crown reinforcement embodying the present invention.
Figure 3:
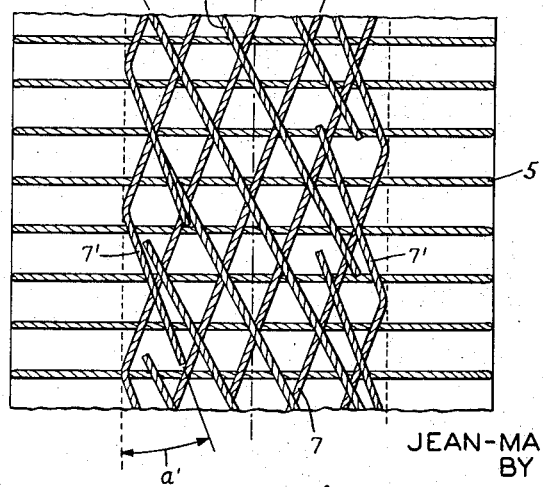
FIGURE 3 is a developed longitudinal sectional view of the crown reinforcements of the tire shown in FIGURE 2 with the cords of the reinforcing plies shown in widely spaced relation for clarity.

In FIGURES 2 and 3, the tire 1 has the following customary elements: a grooved tread 2 rigidified by a crown reinforcement 3, two sidewalls 4 and 4' containing a carcass 5 of radial cords, i.e., arranged in the planes passing through the axis of rotation of the tire, such carcass being anchored around the bead wires 6 in the beads at the inner edges of the sidewalls.

The crown reinforcement 3 contains two plies 7 and 8 which extend underneath the tread 2. The lower ply 7 is folded back at the edges of the reinforcement and the folded edges 7' cover the edges of the upper ply 8. In accordance with the invention, the angle $a$ between the cords of the ply 7, running towards the right, and the longitudinal direction of the tire is 18° while the angle $b$ between the said direction and the cords of the ply 8 running towards the left is 25°. The cords in the folded edges 7' of the ply 7 form an angle $a'=18°$ with the longitudinal direction. The purpose of these folded edges is to rigidify the edges of the crown reinforcement. The folded edges 7' each extends over approximately 20% of the width of the reinforcement.

Figure 4:
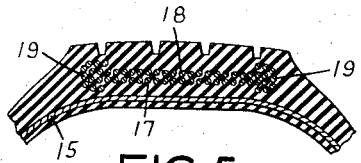
Figure 5:
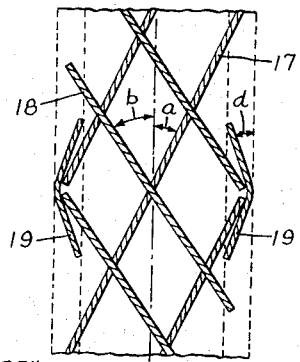

The crown reinforcement shown in FIGURES 4 and 5 comprises two main plies 17 and 18 arranged outwardly of the carcass of radial cords 15. The cords of the ply 17 are directed towards the right and form with the longitudinal direction an angle $a$ of 19.5° (nineteen and one-half degrees); the cords of the ply 8 directed towards the left form with the longitudinal direction an angle $b$ of 35°. In order to rigidify the edges of this reinforcement, each of the two edges of the plies 17 and 18 is enclosed within a folded ply 19, the cords of which form an angle $d=17°$ with the longitudinal direction. In a modification, this rigidification of the edges of the reinforcement may be obtained by soldering of the ends of the cords of the plies 17 and 18 with one another, in case they are metal cords, or by seams (sewing), in case the cords are not metallic.

Figure 6:
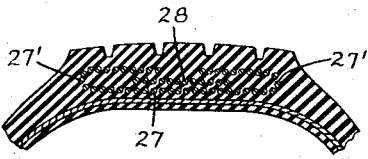
Figure 7:
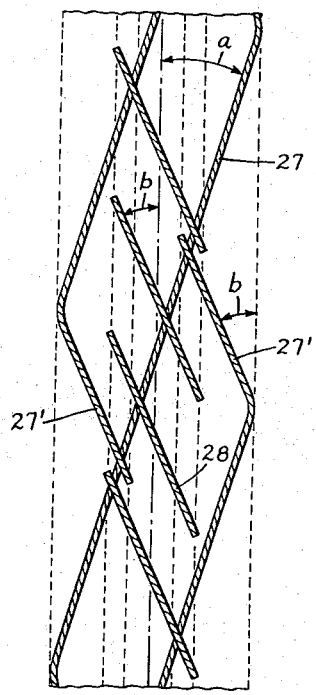

In FIGURES 6 and 7, the crown reinforcement shown is similar to that shown in FIGURES 2 and 3. It differs, however, in that the ply 28 is not as wide as the ply 27 in the folded part 27' of which it is enclosed, and, on the other hand, in that the angles $a$ and $b$ are 17° and 22°, respectively. In this example, the cords of the folded edges 27' form with the longitudinal direction an angle which is different from the angle of the cords in portion 27 of the same ply, which is done in order to render the cords in folded edges 27' parallel with the cords in ply 28.

Figure 8:
Figure 9:
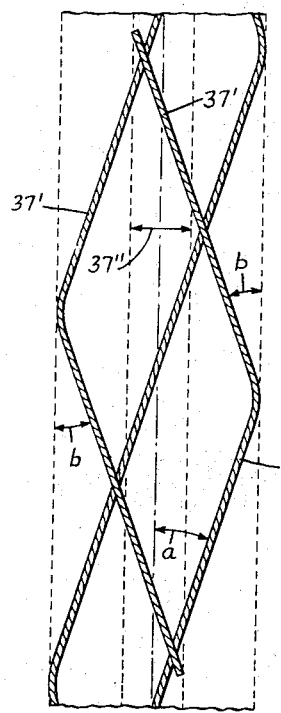

The crown reinforcement shown in FIGURES 8 and 9 is obtained by means of one single ply 37 of cords folded back to constitute the edges of the reinforcement, the folded portions 37' overlapping at 37" over a short distance in the vicinity of the symmetry plane. The cords of part 37 are directed towards the right and form with the longitudinal direction an angle $a$ of 16°; the cords of the folds 37' are directed towards the left and form an angle $b=20°$ with the said direction.

Figure 11:
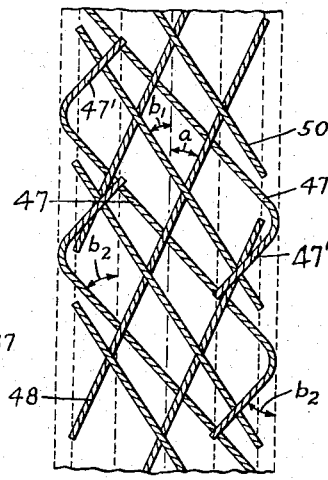
Figure 10:
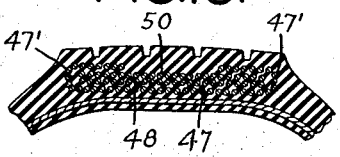

The crown reinforcement shown in FIGURES 10 and 11 differs from the reinforcements in FIGURES 2 and 3 essentially by the presence of two plies 48 and 50 between the folded-back portions 47' of the ply 47. The cords of the latter ply are directed towards the left, those of the ply 48 towards the right, those of the ply 50 towards the left and those of the folded-back parts 47' towards the right. The angles of the cords of these plies formed with the longitudinal direction are, respectively: $a=19°$, $b_1=29.5°$, $b_2=41.5°$.

Figure 12:
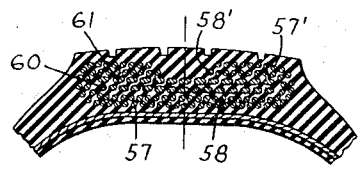
Figure 13:
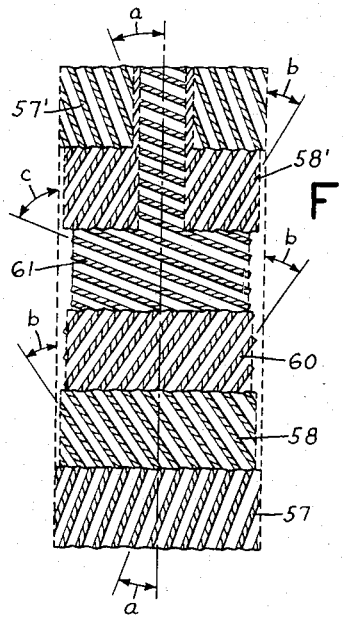

The crown reinforcement in FIGURES 12 and 13 has two plies 57 and 58 directed towards the right and the left, respectively, and folded back over the edges of the reinforcement. Between the latter and the folded edges 57' and 58' are placed two other plies 60 and 61 directed towards the right and the left, respectively. The angle $a$ is 19.5°, the angle $b$ 35° and the angle $c$ 70.5°. In this modification, comprising a comparatively large number of plies, the cords constituting such plies are formed of natural, artificial or synthetic textile fibers.

Figure 15:
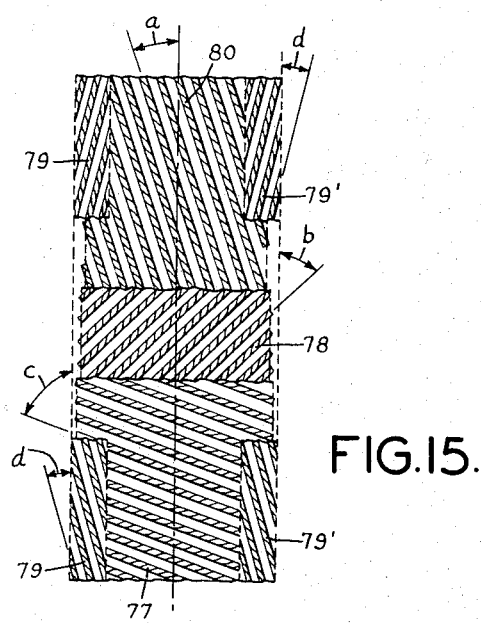
Figure 14:
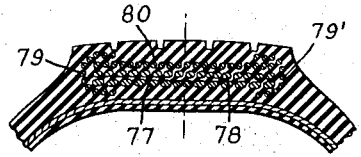

The same may be true of the reinforcement of the crown shown in FIGURES 14 and 15 which comprises three main plies 77, 78 and 80 edged (bound) by two narrow plies 79 and 79' which hold the edges of plies 77, 78 and 80. The plies 77, 78 and 80 are directed towards the left, the right and the left, respectively. The angles $a$, $b$ and $c$ are, respectively, 18.5°, 45° and 71.5°; the angle of the narrow plies 79 and 79', indicated by $d$, is 15°.

Figure 16:
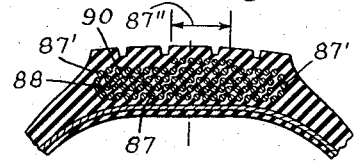
Figure 17:
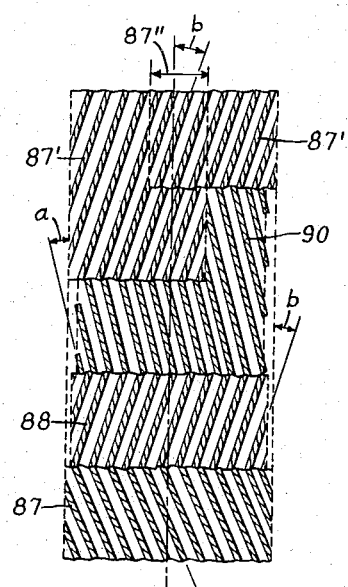

The crown reinforcement shown in FIGURES 16 and 17 comprises a ply 87 directed towards the left and folded back in 87', with an overlapping part 87" in the vicinity of the symmetry plane of the tire. This folded-back ply 87, 87' encloses two plies 88 and 90 directed towards the right and the left, respectively. The angle $a$ is 15°, the angle $b$ is 18°, and the angle $c$ is 25°. It will be noted that the cords of the folded-back portions 87' are parallel to the cords of the ply 88.

The invention is applicable to peak reinforcements consisting of cords made of metal or natural, artificial or synthetic textile material, regardless of the modulus or the hardness of the elastomer in which the cords are embedded in order to form a ply.

Although in all examples described above the crown reinforcements were represented in the drawings as being substantially rectilinear in cross-section, i.e., as being substantially cylindrical in the tire, the invention does not exclude peak reinforcements showing a certain given transversal curvature. As already mentioned above, the radius of transverse curvature should, however, not be less than one-half, and optimally not less than two-thirds of the radius of longitudinal curvature.

The values indicated in all the examples given above for the various angles of the cords with reference to the longitudinal direction of the tire correspond exactly to the trigonometrical equations given before. However, the angles chosen may deviate slightly from these values, subject, however, to the condition that they correspond to an angle OBA, see FIGURE 1, ranging from 80° to 100° and by preference as close to 90° as possible.

Moreover, it is obvious that the invention may be applied to reinforcements other than those illustrated. In particular, it is within the scope of the invention to use additional plies in the crown reinforcement, especially when the crown reinforcement includes two identical or different relations of plies which individually are in accordance with the invention. This is also true when the plies are folded towards the inside of the tire, the plies contain more than two folded portions, the plies have folded portions which are larger than those shown in the drawings or one or several folded plies are not enclosed within the folds of a ply which is folded back, and possibly, of lesser width than the crown reinforcement in its entirey. Moreover, peak plies embodying the invention can be assembled in an asymmetric manner in each half of the casing defined by the median symmetry plane.

Although the crown reinforcements in accordance with the invention are preferably combined with a radial carcass, it is likewise possible to combine them with a carcass, the cords of which are diverging from the radial direction. It should be noted that the invention is not restricted to the use of any special quality or type of rubber or of any special material, such as steel, for example, in the peak plies and/or the carcass.

Accordingly, the examples of the invention set forth above should be considered as illustrative and not limiting the invention as defined in the following claims.

I claim:

1. A tire having a tread, sides and beads and a crown reinforcement substantially co-extensive with said tread, said crown reinforcement comprising a plurality of superimposed plies of cables, the cables of each ply being substantially parallel and the cables of at least two adjacent plies being inclined in opposite directions and at angles $a$ and $b$ relative to one of the two main directions of the tire, the values of said angles $a$ and $b$ corresponding to the equation tangent $(a+b) - 2$ tangent $b = 0$ approximately.

2. The tire set forth in claim 1, in which said crown reinforcement comprises at least thre plies, the cables of which are inclined, respectively, at angles $a$, $b$, $c$, with relation to the longitudinal direction of said tire, the values of said angles corresponding to the equations tangent $(a+b) - 2$ tangent $b = 0$ approximately, and
tangent $(b+c) + 2$ cotan $b = 0$ approximately, the angle $b$ corresponding to the inclination of the cables of the middle ply of the three plies, the cables of the middle ply being inclined oppositely to the inclinations of the other two plies.

3. The tire set forth in claim 2 wherein $a = 18.5°$, $b = 45°$, and $c = 71.5°$.

4. The tire set forth in claim 1 in which said crown reinforcement comprises at least three superimposed plies, the cable of which form, respectively, angles $b_1$, $a$, $b_2$ with the longitudinal direction of said tire, the values of said angles corresponding to the equations tangent $(a+b_1) - 2$ tangent $b_1 = 0$ approximately, and
tangent $(a+b_2) - 2$ tangent $b_2 = 0$ approximately, the cables of the middle ply of said three plies being inclined at said angle $a$ and oppositely to the cables of the other two plies.

5. The tire set forth in claim 1, in which said crown reinforcement consists of plies having cables inclined at angles $a$ and $b$ to the longitudinal direction of the tire, the cables of two adjacent plies being inclined in opposite direction when angles $a$ and $b$ are different, and in the same or opposite directions when the angles $a$ and $b$ are the same.

6. The tire set forth in claim 5 wherein $a = 19.5°$ and $b = 35°$ approximately.

7. The tire set forth in claim 1 wherein the edges of the crown reinforcement plies are joined.

8. The tire set forth in claim 7 in which said crown reinforcement comprises a ply having edges folded around and enclosing at least the edges of the other plies.

9. The tire set forth in claim 7 comprising a pair of lateral plies having a U-shaped cross-section enclosing the edges of said crown reinforcement plies.

10. The tire set forth in claim 1 in which said crown reinforcement has a susbtantially cylindrical shape.

11. The tire set forth in claim 1 in which said crown reinforcement has a transverse curvature on a radius at least one-half as long as the radius of curvature of said reinforcement in the longitudinal direction.

References Cited

UNITED STATES PATENTS

| | | | |
|---|---|---|---|
| 3,175,598 | 3/1965 | Cegnan | 152—361 |
| 3,195,604 | 7/1965 | Boussu et al. | 152—361 |
| 3,240,249 | 3/1966 | Lugi | 152—361 X |

ARTHUR L. LA POINT, *Primary Examiner.*

D. E. HOFFMAN, *Assistant Examiner.*